United States Patent
Koppol

(10) Patent No.: US 7,573,811 B2
(45) Date of Patent: Aug. 11, 2009

(54) NETWORK TRANSPARENT OSPF-TE FAILOVER

(75) Inventor: Pramod V. N. Koppol, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 535 days.

(21) Appl. No.: 11/091,136

(22) Filed: Mar. 28, 2005

(65) Prior Publication Data
US 2006/0215547 A1 Sep. 28, 2006

(51) Int. Cl.
*H04J 1/16* (2006.01)

(52) U.S. Cl. ............... 370/217; 370/216; 370/218; 370/219; 370/220; 370/221

(58) Field of Classification Search ........ 370/391, 370/392, 220, 216, 217, 218, 219, 221, 225, 370/229, 230, 238, 252, 351, 400, 401; 714/1, 714/2, 4, 5, 6, 7, 8, 9, 10, 11, 12, 13, 100
See application file for complete search history.

(56) References Cited

U.S. PATENT DOCUMENTS

| | | | |
|---|---|---|---|
| 6,487,605 B1 * | 11/2002 | Leung | 709/245 |
| 6,910,148 B1 * | 6/2005 | Ho et al. | 714/4 |
| 7,277,383 B2 * | 10/2007 | Choe et al. | 370/219 |
| 7,467,321 B1 * | 12/2008 | Khurana et al. | 714/4 |
| 2003/0056138 A1 | 3/2003 | Ren | |
| 2003/0218982 A1 * | 11/2003 | Folkes et al. | 370/238 |
| 2004/0174825 A1 * | 9/2004 | Li et al. | 370/254 |
| 2004/0260834 A1 * | 12/2004 | Lindholm et al. | 709/238 |
| 2005/0265346 A1 * | 12/2005 | Ho et al. | 370/392 |
| 2006/0198346 A1 * | 9/2006 | Liu et al. | 370/338 |

* cited by examiner

*Primary Examiner*—Aung S Moe
*Assistant Examiner*—Abdullah Riyami

(57) ABSTRACT

A method and apparatus for providing link state routing protocol redundancy in a router. A router includes an active controller and at least one standby controller. An internal adjacency relationship is established between the active controller and the standby controller to enable automatic switchover upon disablement of said active controller. The adjacency relationship is established by mirroring configuration data on a standby controller from an active controller, synchronizing Hello information between the active and standby controllers, and synchronizing database information between the active and standby controllers.

15 Claims, 6 Drawing Sheets

NETWORK TRANSPARENT OSPF-TE FAILOVER

FIELD OF INVENTION

The present invention relates to a method and apparatus for providing link state routing protocol redundancy in a router, and more specifically, the invention relates to providing network transparent failover of the Open Shortest Path First (OSPF) routing protocol with or without traffic engineering extensions (OSPF-TE).

DESCRIPTION OF THE BACKGROUND ART

Routers or other types of switches are used to route data packets over one or more links between a data source in a network, such as a customer's computer connected to the data network and a destination. Routing protocols such as Border Gateway Protocols ("BGP"), Routing Information Protocol ("RIP"), and Open Shortest Path First Protocol ("OSPF") enable each machine to understand which other machine is the "next hop" that a packet should take towards its destination. Routers use the routing protocols to construct routing tables. Thereafter, when a router receives a data packet and has to make a forwarding decision, the router "looks up" in the routing table for the next hop. Conventionally, the routers look up the routing table using the destination IP address provided in the data packet as an index.

In the basic OSPF algorithm, a router broadcasts a Hello packet including the router's own ID, neighboring routers' IDs the router knows, and other information that is needed for agreeing upon timer values, and the like. The router also receives such hello messages from other neighboring routers. If a router receives a Hello packet, which includes its own ID, from another router that the router has been aware of, on the understanding that the two routers have become aware of each other, the two routers exchange network link-state information by sending routing protocol packets. The router creates a routing table based on the network link-state information collected by running a routing algorithm, typically the Dijkstra algorithm. With OSPF the routing table determines the next hop on a least cost path to a destination route. The least cost path can be determined by potentially considering many factors including link metrics and available network link bandwidth. When a network link changes, each router calculates the shortest path for itself to each of the destinations, and sets its own routing table according to the least cost paths. A route calculation unit is used for creating a routing table.

The OSPF instance on each router, while it transmits or receives control packets and network link-state information, keeps track of the states of other neighboring routers on the network to which this router is connected, and also keeps track of the states of the interfaces through which this router is connected to networks. With regard to the states of neighboring routers, the router keeps track of the state of routing information exchange, such as whether each of those routers has completed the transmission and reception of network link-state information. With regard to interface state, each router keeps track of the identity of neighboring routers that have been discovered through hello messaging with routers that are connected through this interface, as well as whether the neighboring routers are aware of the existence of this router.

When conventional IP routers lose their primary controller circuitry and operation falls back to a redundant controller, the relationships established with the neighboring routers need to be reset. From the perspective of the other nodes in the network, it appears as if the neighboring router in the area has gone down, and subsequently comes back up again. Specifically, an outage ensues while the router releases the routing states and packet forwarding tables. During this outage, the neighboring nodes may be unable to forward packets to their destinations.

Furthermore, system operators may be required to perform some maintenance or updates to an active controller. If the active controller is taken off-line (e.g., powered down), a similar outage ensues during the switchover to the redundant controller. Accordingly, there is a need in the art to provide a transparent switchover (failover) between redundant controllers during a controller failure or scheduled maintenance condition.

SUMMARY OF THE INVENTION

The disadvantages heretofore associated with the prior art, are overcome by the present invention of a method and apparatus for providing link state routing protocol redundancy in a router. In particular, a router of the present invention includes an active controller and at least one standby controller.

The active controller is used to establish and maintain the databases associated with neighboring routers, distribute routing tables, route packets of information using the routing tables, among other routing functions conventionally known in the art. The standby controller is in an inactive state with respect to OSPF-TE normal operations, and becomes active during a switchover mode of operation. The standby controller operates in standby mode during normal operations of the router. During standby mode of operation, the standby controller establishes an enhanced OSPF-TE adjacency with the OSPF instance on the active controller. That is, an internal adjacency relationship is established between the active controller and the standby controller to enable automatic switchover upon disablement of said active controller. This adjacency is used by the standby controller to operate in a manner that is synchronized with the active controller, and thus later enabling it to take on the role of the active controller in the event of a failover caused by a hardware or software failure, or in the event of a switchover caused by operator directive.

In one embodiment, the internal adjacency relationship is established by mirroring configuration data on a standby controller from an active controller. Thereafter, Hello information is synchronized between the active and standby controllers. Moreover, database information is also synchronized between the active and standby controllers.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
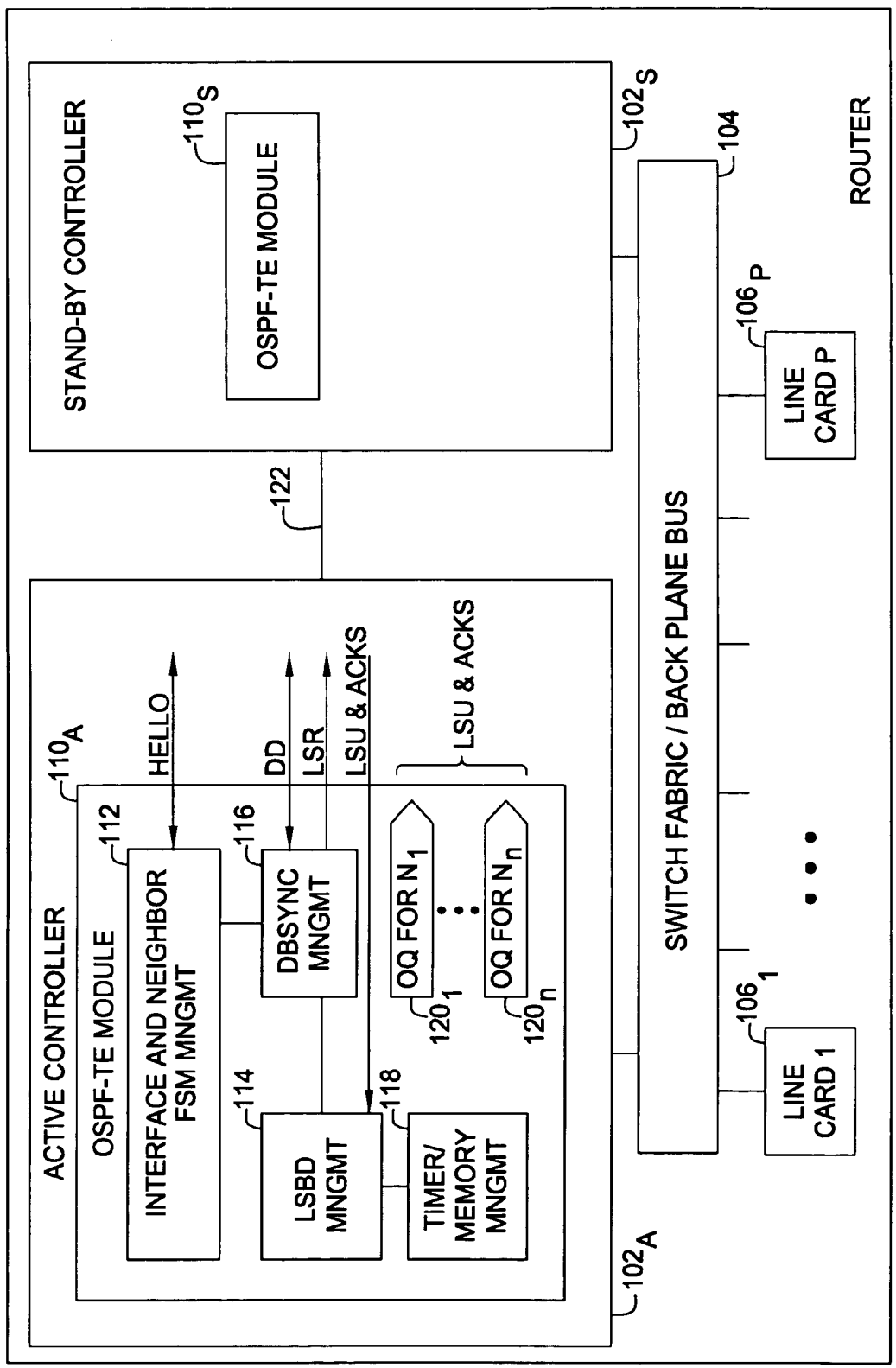
FIG. 1 depicts a high-level block diagram of an exemplary router suitable for implementing the present invention.

The present invention provides a method and apparatus providing redundancy of the Open Shortest Path First (OSPF) or OSPF with Traffic Engineering (OSPF-TE) routing protocol. An active controller of a router provides OSPF-TE operations. The OSPF-TE operations include techniques for generating, maintaining, and verifying one or more adjacencies to one or more neighbor routers, exchanging network information with neighbors, and updating best network routes to a local routing table. It is noted that when a link-state database of two neighboring routers is synchronized, the routers are referred to as being "adjacent" to each other.

In the present invention, each router is provided with at least one redundant (i.e., standby) controller, where at least one standby controller is coupled to the active controller. The active controller is used to establish and maintain the databases associated with neighboring routers, distribute routing tables, route packets of information using the routing tables, among other routing functions conventionally known in the art.

The standby controller is in an inactive state with respect to OSPF-TE normal operations, and becomes active during a switchover mode of operation. The standby controller operates in standby mode during normal operations of the router. During standby mode of operation, the standby controller establishes an enhanced OSPF-TE adjacency with the OSPF instance on the active controller. This adjacency is used by the standby controller to operate in a manner that is synchronized with the active controller, and thus later enabling it to take on the role of the active controller in the event of a failover.

Specifically, in the standby mode, during an initial synchronization with the active controller, the standby controller initializes itself with mirrored configuration data from the active controller. The standby controller synchronizes its protocol state with that of the active controller using certain enhancements to the standard OSPF-TE protocol, such as synchronizing hello messages with peer information, as well as synchronizing databases and providing indication of pending flooding condition at the active controller, as described below in further detail. The active and standby controllers operate during normal operation, and appear as a single entity to the peer routers in the network.

In an instance where the active controller stops operation, either by operator directive or by failure, the router operations is switched (i.e., switchover) to the standby controller and all OSPF protocol operations are performed on the standby controller. In the present invention, all states of the link state protocol immediately function as if a failure had not occurred. Such switchover between controllers is transparent to the other nodes (e.g., routers) in the network area, such that packet distribution continues unimpeded. That is, the neighboring routers will not observe any substantial traffic differences during or after the switch-over, and no additional information is needed from neighbor routers after the switch-over. Accordingly, the router's forwarding capability will remain unaffected and a neighbor router will not notice that a system failure/maintenance event has occurred.

FIG. 1 depicts a high-level block diagram of an exemplary router 100 suitable for implementing the present invention. The present invention is implemented in a router or any other level 3 switch capable of routing packetized information using the OSPF-TE protocol in a packet switched network, such as the Internet. In one embodiment, the present invention is suitable for use in the core and edge routers.

Referring to FIG. 1, the router 100 comprises at least two controllers, such as active controller 102a and standby controller 102s (collectively controllers 102), a switch fabric 104, and a plurality of line cards $106_1$ through $106_p$ (collectively line cards 106). The line cards 106 provide external I/O interfaces with neighboring nodes, such as neighboring routers. The line cards 106 are coupled to an in-band transmission interface, such as the switch fabric 104 or a backplane bus. The line cards 106 and switch fabric 104 collectively transfer the packetized data between routers according to the routing tables generated by active controller, in accordance with one or more routing protocols, such as the OSPF-TE protocol.

Specifically, the router 100 creates a routing table (not shown) based on the network link-state information collected by running the link-state routing algorithm, typically the Dijkstra algorithm. In OSPF, the routing table can specify the least-cost path, based on a cost determined by considering many factors including network link bandwidth, the packet route, among other factors. When a network link changes, each router calculates the shortest path for itself to each of the networks and sets its own routing table accordingly to the paths. A route calculation unit (not shown) is used for creating a routing table.

The active controller 102a and standby controller 102s are coupled to each other via a communications channel, such as the in-band switch fabric/backplane bus 104, or an out-of-band (e.g., dedicated) communications channel. The active controller 102a communicates network link protocol information over the in-band (fabric switch) channel 104 or out-of-band communication channel 122 to the standby controller 102s. For purposes of understanding the invention, "in-band" refers to communication channels/links that transfer the packetized data between routers, while "out-of-band" refers to dedicated communication channels/links not associated with the in-band data packets. In one embodiment, the out-of-band communication channel 122 is a duplex Ethernet connection or any other type of fast and reliable communication channel.

Network link protocol information can be forwarded among active and standby controllers in the form of standard OSPF protocol data units (PDUs) with minor enhancements that encode additional information described below in further detail. The same redundancy software for OSPF-TE operations runs on both the active controller 102a and the standby controller 102s. Redundancy software for OSPF operations controls updating of network link protocol information between the active controller 102a and the standby controller 102s, and distinguishes between an active mode and a backup mode using system state information, as described in more detail-below. In one embodiment, the OSPF software versions on the active and standby controllers may be different, subject to the condition that the two versions are compatible with respect to the redundancy related functionality.

Each controller 102 comprises an OSPF-TE module 110. FIG. 1 illustratively shows the major component sub-modules of the OSPF-TE module 110a for the active controller 102a. However, a person skilled in the art will appreciate that the OSPF-TE module 110s of the standby controller 102s is identical to the OSPF-TE module 110a of the active controller 102a. Each OSPF-TE module 112 comprises an interface and neighbor finite state machine (FSM) manager (INF-SMM) 112, a link state database (LSDB) manager 114, a database sync (DBSync) manager 116, a timer/memory (TM)

manager 118, and a plurality of output queues (OQ) $120_1$ through $120_n$ (collectively output queues 120).

The INFSMM 112 is responsible for tracking Hello messages to the neighboring routers, as well as the standby controller $102_s$. The DBSync manager 116 exchanges database descriptions with the standby controller 102s during database synchronization between the active and standby controllers, as well as between the active controller and external neighboring routers. Further, the DBSync manager 116 sends link state requests (LSR) to the other routers in the network, as well as database descriptions (DD) to the OSPF-TE $110_s$ of the standby controller 102s. The LSDB manager 114 receives, stores, and processes link state updates (LSU) and acknowledgements (ACKs) from other neighboring routers in the network area. The timer and memory manager 118 provide resources for OSPF operations including, for example, memory for storing the link state database as well as timer operations for hello messaging. The output queues 120 include one queue per neighbor and each queue contains link state advertisements (LSA) or acknowledgements that need to be sent to the associated neighbor. The LSAs are removed from a queue when its receipt is acknowledged by its neighbor.

As discussed above, the present invention provides transparent switchover between controllers, for example, during a hardware/software failure of the active controller failure or during an operator directive to stop activity at the active controller 102a (e.g., for maintenance activity). The present invention performs transparent failover for those adjacencies whose neighbor FSM is in a "FULL state" as defined by the standard OSPF protocol. Generally, FULL state means that the databases of neighboring (adjacent) routers are in sync and that the link connecting the neighbors can be used for routing purposes. Thus, the present invention is capable of preserving the FULL state adjacencies during switchover.

Further, during switchover, ongoing activity between the active controller and its peer (adjacent) routers is taken over by the standby controller and continues in a seamless manner in accordance with the protocol specification. For example, the active controller 102 may be waiting for an acknowledgement (ACK) message from one or more of its peers. During a switchover to the standby controller, the standby controller tracks the need for such ACKs and resends any LSAs where necessary according to standard protocol procedures.

Moreover, during the switchover to the standby controller 102s, the standby controller is able to seamlessly continue with pending tasks that the active controller 102a was performing. For example, once a switchover is initiated, the standby controller 102s is capable of flooding new link state advertisements (LSAs) received from an adjacency, but had not yet been flooded to other adjacencies by the active controller. Alternatively, LSAs that have aged, but have not yet been flushed by the active controller 102a will be seamlessly flushed by the standby controller 102s after the switchover. Aging of LSAs is done both on the active and standby controllers. Although there is a potential for a drift in timers, it is ensured that if an LSA is advertised first by the active and later (after failover) by the standby, the age of the LSA at the standby is greater than that advertised by the active before the failover. When the standby receives an LSA from the active, the standby always uses the age of the LSA received from the active.

Figure 2:
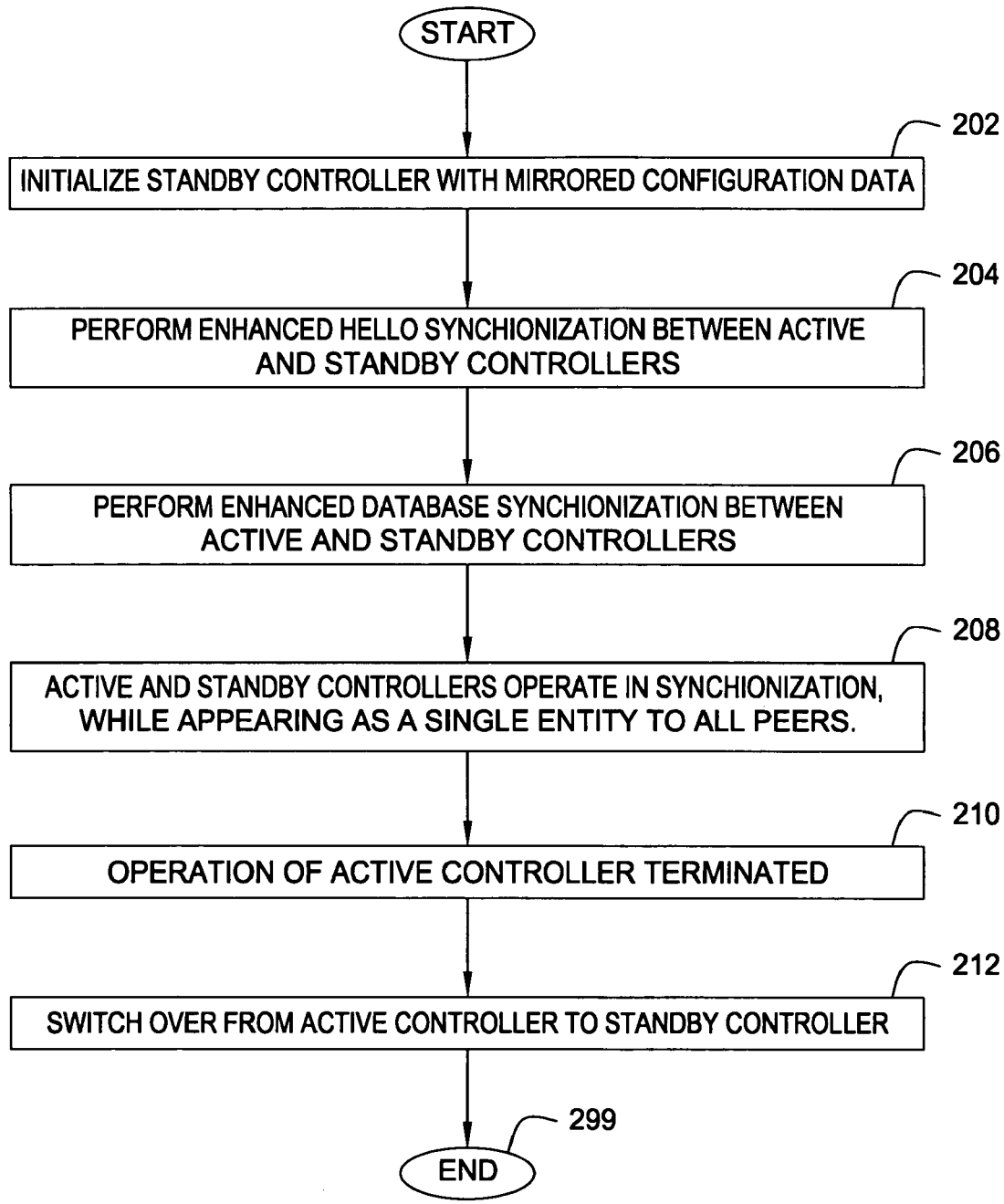
FIG. 2 depicts a flow diagram of a method for providing transparent switchover between controllers of the exemplary router of FIG. 1.

FIG. 2 depicts a flow diagram of a method 200 for providing transparent switchover between controllers of the exemplary router of FIG. 1. Method 200 starts at step 201 and proceeds to step 202, where the standby controller 102s is initialized by receiving configuration data mirrored from the active controller 102a. In particular, the configuration data illustratively includes information for the interfaces in which the OSPF protocol is enabled, the OSPF area that is configured on each such interface, among other information. Another example is any timer related information, such as dead-interval information that may be configured and used for hello messaging. It is noted that mirroring configuration data between the active and standby controllers may be performed by various techniques, as conventionally known in the art.

At step 204, the protocol state of the standby controller 102s and active controller 102a are synchronized. In particular, at step 202, an enhanced Hello messaging synchronization of the present invention is performed between the active and standby controllers. Generally, the active controller 102a suspends all external Hello processing to the peer routers, and sends internal Hello messages to the standby controller to provide current hello information associated with the peers. Thus, the Hello messaging synchronization is enhanced by providing hello information associated with the peer routers. Once the standby controller acknowledges to the active controller that it has been updated with the current hello related information, and bidirectional communications are established between the active and standby controllers, the active controller reinitiates external Hello processing. A detailed discussion of the enhanced Hello synchronization is discussed below with respect to method 204 of FIGS. 3A and 3B.

At step 206, enhanced database synchronization is also performed between the active and standby controllers. In particular, the enhanced database synchronization is the same as conventional OSPF-TE database synchronization, except that if an LSA is present in any output queue 120 of the active controller 102a, a flag is set at the active controller to indicate a "flooding pending" condition at the active controller 102a. In one embodiment, the enhanced database synchronization is performed contemporaneously with the enhanced Hello messaging synchronization of step 204. A detailed discussion of the enhanced messaging Hello synchronization is discussed below with respect to method 206 of FIG. 4.

At step 208, the active controller 102a and standby controller 102s operate in synchronization, while appearing as a single controller entity to the peer routers. In particular, the active controller receives all Hello messaging and LSA information from the peer routers, and updates the standby controller periodically to maintain the synchronization therebetween.

When an LSA is received from an external peer, the active controller performs flooding as usual, with the only exception that it does not send an ACK for the LSA until it receives an ACK from the standby controller. This requirement does not apply for self-originated LSAs.

At step 210, the active controller 102a becomes inoperative. Specifically, a software or hardware failure may occur, or a system operator may direct the active controller 102a to cease operations, illustratively, for maintenance or upgrade purposes. Once the active controller ceases to operate, the method proceeds to step 212.

At step 212, a switchover procedure occurs between the standby controller 102s and the active controller 102a. Specifically, the standby controller 102s takes over routing operations at the router 100, while the active controller 102a ceases to operate. At step 299, the method 200 ends, such that from the perspective of the peers in the network, the cessation of operation by the active controller, and the switchover procedure is transparent. That is, routing of packets and exchanging external Hello messages and LSAs is negligibly disrupted.

Further, the lengthy downtime exhibited during switchover of the controllers by an operator is now non existent.

Figure 3A:
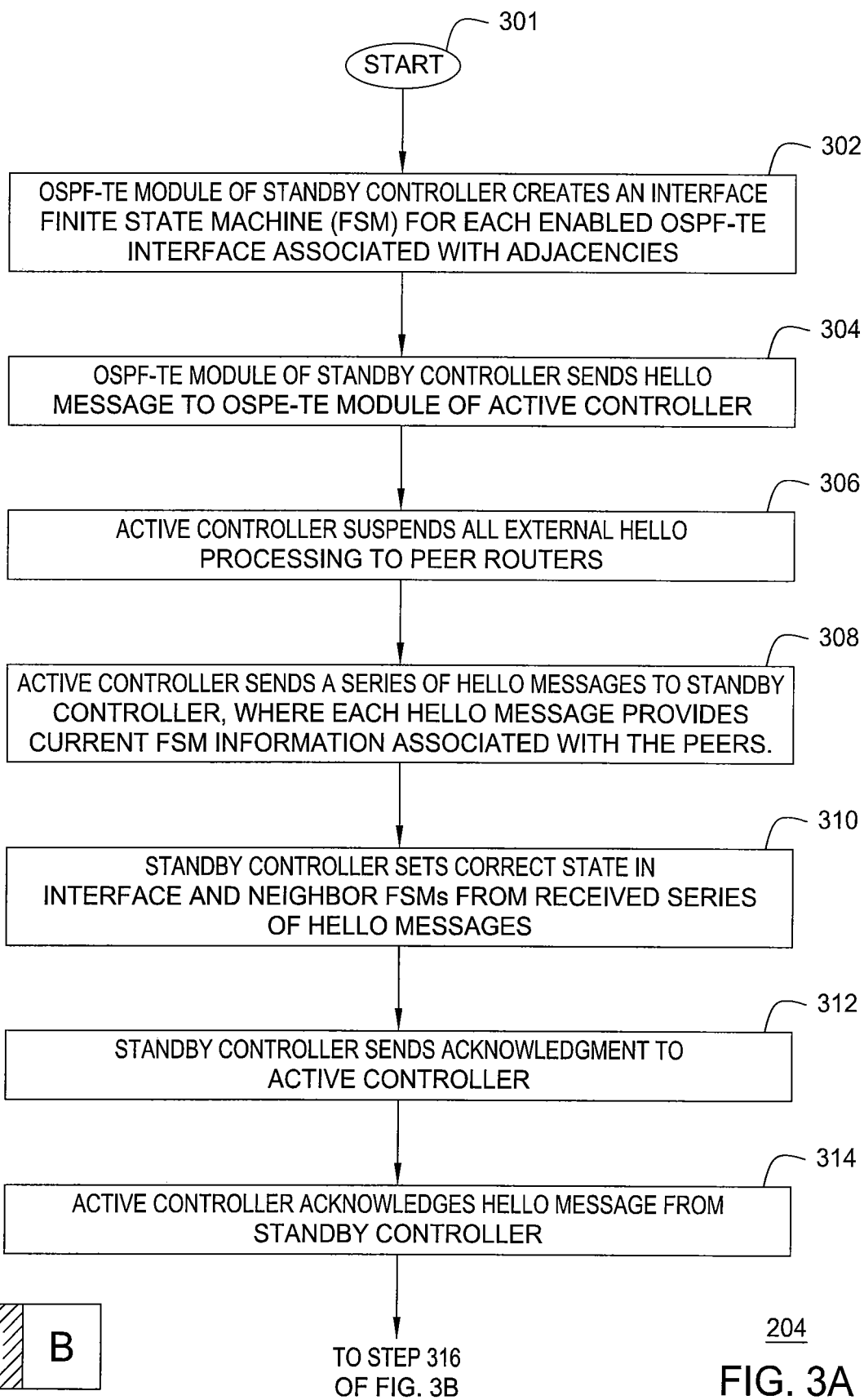
FIGS. 3A and 3B collectively depict a flow diagram of a method for providing Hello synchronization between the controllers of the router.
Figure 3B:
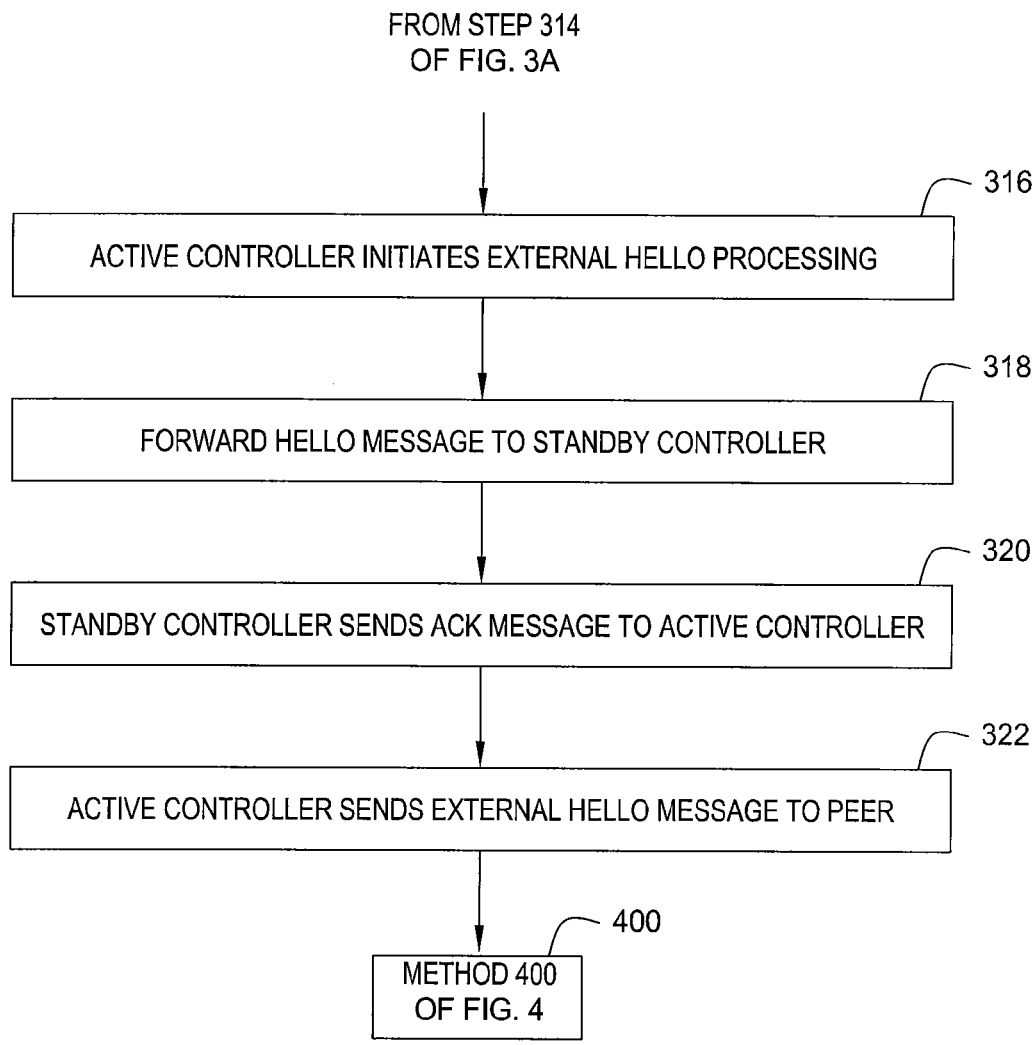
Figure 3B:

FIGS. 3A and 3B collectively depict a flow diagram of a method 204 for providing Hello synchronization between the controllers of the router. The method 204 starts at step 301 and proceeds to step 302, where the OSPF-TE module 110s of the standby controller 102s create an interface finite state machine (FSM) for each enabled OSPF-TE interface associated with each adjacent neighbor. Specifically, the interface and neighbor FSM manager 112 generates a state table for enabled controllers of adjacencies. The INFSMM 112$_s$ sets the current state in each FSM to either "waiting" or "p2p". The waiting state represents a state where further information is waiting to establish the next state in the interface FSM, and the p2p state represents that the interface is a point to point interface. The method 204 then proceeds to step 304.

At step 304, the OSPF-TE module 110s of the standby controller 102s sends a Hello message to the OSPF-TE module 110a of the standby controller 102a. At step 306, the active controller suspends all external Hello processing to peer neighbors. That is, the active controller 102a no longer sends or receives Hello messages to/from its peers, thereby temporarily locking the configuration information of the active controller 102a. The method 204 then proceeds to step 308.

At step 308, the active controller 102a sends a series of internal Hello messages to the standby controller 102s. Each internal Hello message includes information that helps, along with configuration data, in establishing the current FSM state information about a peer router. At step 310, the standby controller 102s uses the received information to set the correct state of its interface and neighbor FSMs. As such, the status of the interface and neighbor FSMs of the standby controller 102s are mirrored (i.e., synchronized) from the active controller 102a. The method 204 then proceeds to step 312.

At step 312, the standby controller 102s sends an acknowledgement (ACK) for all the internal hello information to the active controller 102a. The acknowledgement lets the active controller know that the Hello messages have been received and the FSM information has been updated.

At step 314, the active controller 102a acknowledges the internal Hello message from the standby controller 102s. In particular, once the standby controller has received the FSM information associated with the external peers, from the active controller in step 308, the active controller responds to the Hello message sent by the standby controller at step 304. The response from the active controller to the standby controller represents notification that bidirectional communications between the active and standby controllers is established.

At step 316, the active controller 102a restarts the external Hello processing. That is, the suspension condition of step 306 above is terminated, and the active controller 102a is now able to receive external Hello messages from peer routers. At step 318, the active controller 102a forwards the external Hello messages containing new information to the standby controller 102s. Accordingly, the peer routers may send Hello messages with new information to the active controller undergoing a switchover process after that active controller had suspended Hello message processing (i.e., step 306).

Specifically, in one embodiment, each received external Hello message is forwarded to the standby controller for updating the FSMs status, regardless of whether or not there is new information present in the received external Hello messages. The standby controller uses the forwarded Hello messages to update its FSM current states.

In a second embodiment, for each received external Hello message at the active controller, a determination is made whether the received external Hello message includes new information. In this instance, only the Hello messages that contain new information are forwarded to the standby controller 102s. In either embodiment, step 318 enables the active controller 102a to continue processing incoming external Hello messages from the peer routers, and forward any updated information to the standby controller 102s, thereby keeping the standby controller synchronized with the active controller in terms of hello processing. It is noted that the standby controller 102s does not employ any hello timers at this time, except for the timers associated with the adjacency with the active controller.

At step 320 the standby controller 102s sends an acknowledgment message to the active controller 102a, signifying that the standby controller 102s has updated its FSM states and contains the same FSM information as the active controller 102a.

Once the active controller receives the acknowledgement message from the standby controller 102s, at step 322, the active controller is permitted to send external Hello messages to the peer routers. Accordingly, method 204 provides a novel technique to update and synchronize neighbor relationships at the standby controller 102s.

The method 204 then proceeds to perform database synchronization between the active and standby controller (step 206 of FIG. 2). This procedure for database synchronization is the same as that of standard OSPF procedures except for the following distinction. In particular, while responding to any link state requests from the standby controller, the active controller 102a sends the LSAs with an indication of whether an LSA is in the middle of being flooded to external neighbors or not. In one embodiment, a "flooding pending" flag can be associated with each such LSA. At this time, any new LSAs received from the external peers are handled at the active controller using Method 206 as discussed below.

Figure 4:
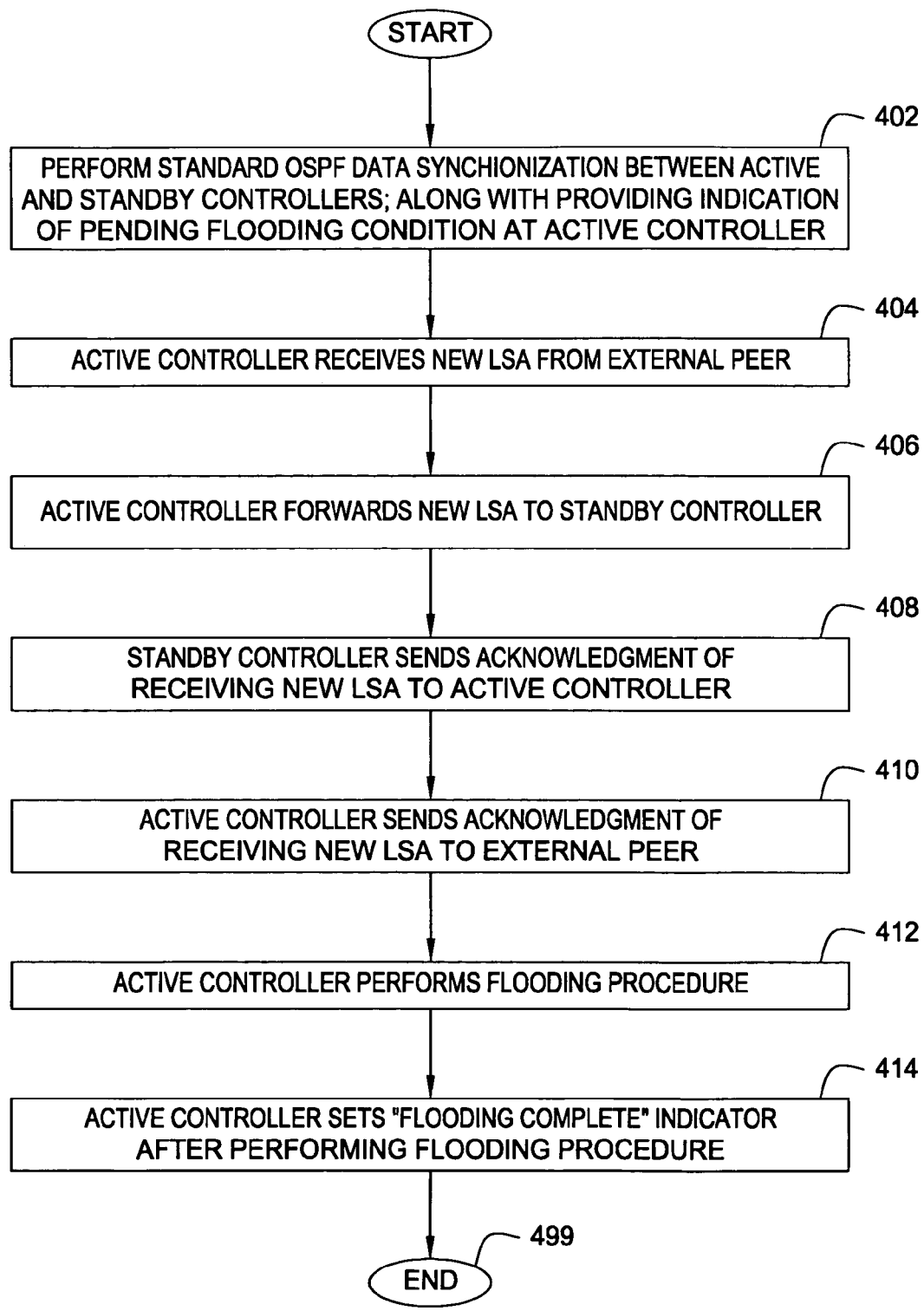
FIG. 4 depicts a flow diagram of a method for providing database synchronization between the controllers of the router.

FIG. 4 depicts a flow diagram of a method 206 for providing database synchronization between the controllers 102 of the router 100. It is noted that method 206 is performed contemporaneously with the enhanced database synchronization procedure described above. Referring to FIG. 1, each OSPF-TE module 110 includes and output queue (OQ) 120 for each neighbor. The OQs 120 store the LSA information being flooded to the neighbors. In order to provide transparent switchover between the controllers, if LSA information is stored in an OQ 120, then as the active controller 102a and standby controller 102s exchange information, the active controller 102a will need to provide indication to the standby controller 102s that the OQ 120 includes LSA information. The OQ status needs to be provided to the standby controller in case the active controller fails immediately after the information exchange (step 208) between the controllers occurs, but prior to the flooding of the LSAs to the neighbors by the active controller is completed. Without updating the OQ information at the standby controller, the standby controller would not be able to perform the flooding operation in place of the active controller after switchover. Thus, the present invention sets a flag in the active controller to indicate "flooding pending" if an LSA is stored in any OQ 120 of the active OSPF-TE module 110a.

Referring to FIG. 4, the method 206 starts at step 401, and proceeds to step 402, where database synchronization between the active and standby controller is performed using standard OSPF procedures, along with sending the LSAs with an indication of whether an LSA is in the middle of being flooded to external neighbors. In other words, the standard OSPF procedure is enhanced by providing a flag at the active controller to signify a pending flooding condition associated with the active controller.

At step 404, the active controller receives a new LSA from an external peer. The new LSA is stored in an output queue(s) (OQ) 120 of the active OSPF-TE module 110a, and awaits flooding to other external peers. As such, the active controller will queue the LSA for the standby controller.

At step 406, the active controller 102a forwards the new LSA to the standby controller 102s and may also flood it to other neighbors. In this manner, both controllers 102 are now aware of the new LSA.

At step 408, the standby controller 102s sends an acknowledgement to the active controller 102a for the received LSA. Specifically, the LSDB manager 114s of the standby OSPF-TE 110s sends the acknowledgment to the LSDB manager 114a of the active OSPF-TE 110a. At this time, the active controller is aware that the standby controller has been updated with the new LSA information.

At step 410, the active controller sends an acknowledgment message to the external peer indicating receipt of the new LSA. In one embodiment, the LSDB manager 114a of the active OSPF-TE 110a sends an acknowledgement message to the external peer. This is required to handle the situation where an external peer sends an LSA to the active controller 102a. If the active controller acknowledges this LSA before the standby controller is guaranteed to receive the LSA and then crashes, the standby controller would have no way to obtain a copy of the LSA.

At step 412, the active controller continues to perform the flooding procedure initiated in step 406. Specifically, the output queues 120 transmit (flood) or retransmit upon timeout the LSA to the external peers. At step 414, the active controller 102a sets a "flooding complete" indicator to indicate to the standby controller 102s that the active controller has performed the flooding procedure. Specifically, the flooding complete indicator is set at the active controller and sent to the standby controller when the LSA has been removed from all the external neighbors for which flooding was needed. As such, if the active controller fails, the standby controller 102s will have indication that the active controller has already sent (i.e., flooded) the LSA, and does not need to perform the flooding procedure for that particular LSA. The method 206 then proceeds to step 499, where method 206 continues as long as the protocol operation continues. It is noted that at no point does the active controller send information about the internal adjacency with the standby controller to any of the external peers.

It is also noted that steps 406 and 414 may be performed in the aggregate. That is, each new LSA does not have to be immediately forwarded to the standby controller. Rather, the active controller may wait for a time such that a group of new LSAs are sent together to the standby controller. Similarly, the flooding complete indicators may be set collectively, rather than individually.

Figure 5:
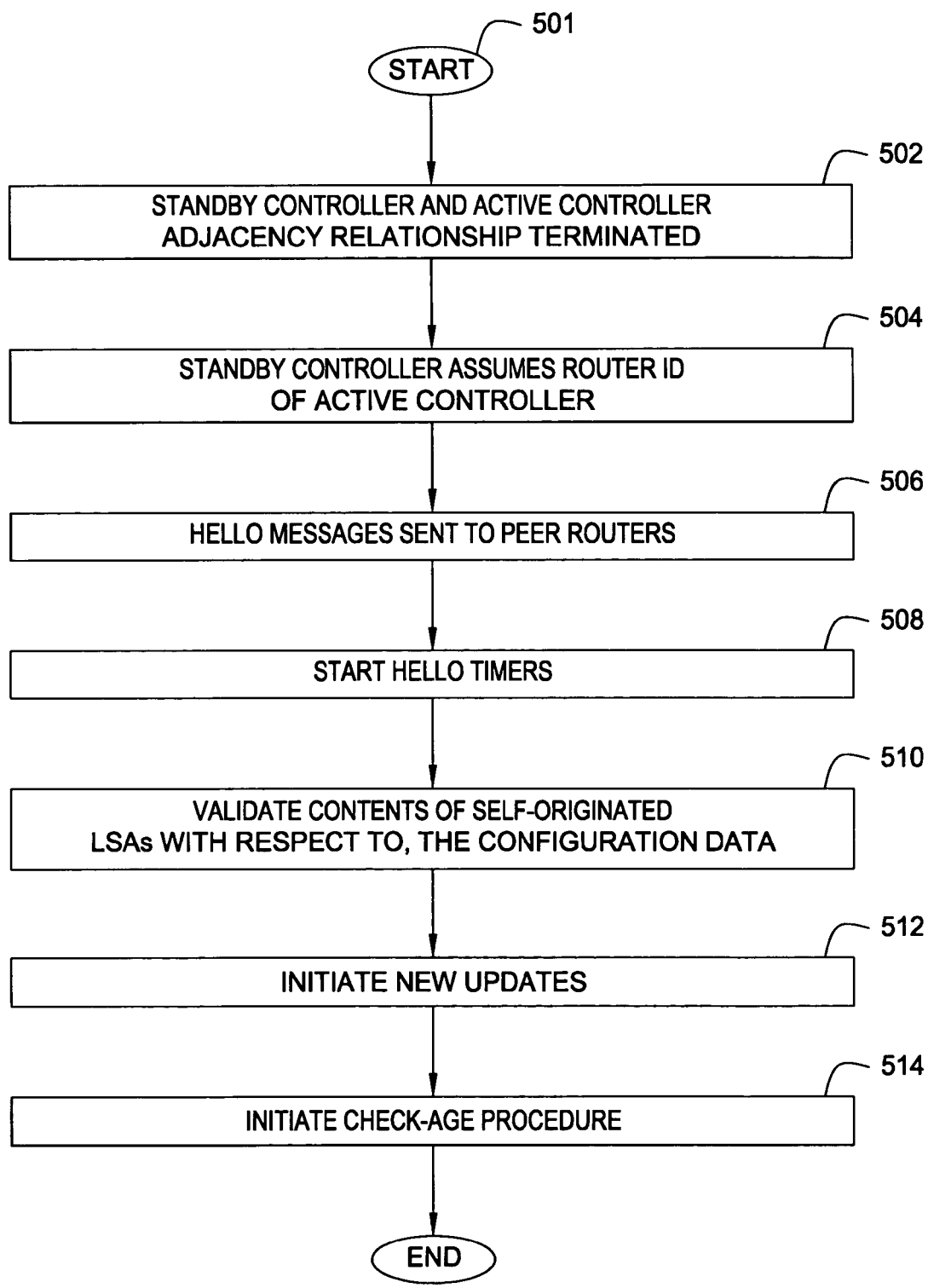
FIG. 5 depicts a flow diagram of a method for switching over from the active controller to the standby controller.

Once methods 204 and 206 have been performed, the active controller 102a and standby controller 102s operate in sync (step 208), while appearing as a single entity to all of the external peers. That is, the active controller 102a forwards all new LSAs to the standby controller 102s, thereby constantly maintaining the synchronization therebetween, such that in an event of a failure or stoppage by operator directive of the active controller (step 210 of FIG. 2), the standby controller can switchover and transparently continue operations at the router. FIG. 5 depicts a flow diagram of a method 212 for switching over from the active controller 102a to the standby controller 102s. The method 212 starts at step 501, where the active controller 102a stops operations, either by failure or operator directive. The method 212 proceeds to step 502, where the adjacency between the active controller and the standby controller is terminated, if it not already terminated at step 501. Specifically, the standby controller 102s discards the adjacency relationship with the active controller 102a. That is, connectivity with the active controller is terminated either by the failure of the active controller or by operator directive. However, the link state information stored in the link state database that was obtained from the active controller 102a is retained by the standby controller 102s.

At step 504, the standby controller assumes the identity of the active controller. This includes taking over the router identifier that was used by the active controller in its communication with the external peers.

At step 506, the standby controller 102s sends external Hello messages to the peers. That is, the standby controller 102s stands in the shoes of the active controller, and sends Hello messages to the external peers to keep the adjacencies alive.

At step 508, the timer/memory manager 118s of the OSPF-TE module 110s initiates Hello timers. At this point, the standby controller starts hello related timer activity as per standard OSPF procedures. The Hello timers are utilized to periodically send out hello information to external peers as well as to keep track of hello activity initiated by the neighbors.

At step 510, the OSPF-TE module 110s of the standby controller 102s validates the contents of the self-originated LSAs with respect to the configuration data. In particular, the OSPF-TE module 110s ensures that if the configuration information requires any of the self-originated LSAs to be reoriginated, that can be performed by the standby controller. This validation ensures that if the active controller initiated flooding of some self-originated LSA, but failed before the standby controller became aware of such flooding, then the standby can recover by reoriginating the self-originated LSAs in place of the active controller, as required.

At step 512, new LSA updates are initiated, as required, in accordance with the flooding pending flag. For each LSA for which the flooding complete indicator was not received from the active controller, the flooding procedure is reinitiated by the standby controller. Other scenario where flooding may need to be initiated is if some LSAs age reaches a maximum age, as specified in the OSPF standards. At step 514, a checkage procedure is initiated as per the standard OSPF protocol.

The method 212 then proceeds to step 599, where the standby controller now continues to perform standard OSPF operations as if it were the active controller and the switchover method 500 ends. Specifically, switchover from the active controller 102a to the standby controller 102s has occurred transparently from the perspective of the peer routers.

The advantages of providing the transparent switchover of the present invention include providing controller redundancy in a manner that is least intrusive to the network in terms of downtime and system operator intervention. Specifically, the present invention provides redundancy of the Open Shortest Path First (OSPF-TE) routing protocol. Providing such redundancy provides a low cost method of ensuring packet delivery during failure of the active controller, with minimal downtime.

Further, the present invention may be utilized by a system operator illustratively performing maintenance tasks. For example, software upgrades to the controllers may be performed unobtrusively from the perspective of the peer routers in the network. In particular, the system operator may first upgrade the standby controller, then perform the switchover procedure from the active controller to the newly upgraded standby controller. Accordingly, the system operator may upgrade the software on the previously active controller, without having to take the router out of service for a length of time.

Although various embodiments that incorporate the teachings of the present invention have been shown and described in detail herein, those skilled in the art can readily devise many other varied embodiments that still incorporate these teachings.

What is claimed is:

1. A method for providing link state routing protocol redundancy in a router, comprising:

establishing an internal adjacency relationship between an active controller and a standby controller in said router to enable automatic switchover upon disablement of said active controller, comprising mirroring configuration data on the standby controller from the active controller;

synchronizing Hello information between said active and standby controllers, said synchronizing comprising said active controller suspending external Hello processing to peer routers and said standby controller sending acknowledgement messages to said active controller to signify updating of said standby controller; and reinitiating external Hello processing at said active controller upon receiving said acknowledgement messages from said standby controller.

2. The method of claim 1, wherein said synchronizing Hello information further comprises synchronizing information associated with peer routers.

3. The method of claim 2, wherein said synchronizing Hello information further comprises:

sending internal Hello messages from the active controller to the standby controller.

4. The method of claim 3, further comprising:

forwarding external hello messages to said standby controller; and sending external Hello messages to peers upon receipt of acknowledgement from said standby controller.

5. The method of claim 1, further comprising synchronizing database information between said active and standby controllers.

6. The method of claim 5, wherein in an instance link state advertisements (LSAs) are present in an output queue of said active controller, a flooding pending indicator is set at said active controller.

7. The method of claim 6, wherein said synchronizing database information comprises:

receiving, at said active controller, at least one new LSA from at least one external peer;

forwarding said at least one new LSA to said standby controller; and setting said flooding pending indicator.

8. The method of claim 7, wherein said synchronizing database information further comprises:

receiving, at said active controller, an acknowledgement in response to said standby controller receiving said new LSA;

and sending an acknowledgment to said at least external peers in response to receiving said at least one new LSA.

9. The method of claim 8, wherein said synchronizing database information further comprises:

flooding said at least one LSA to peers; and initiating a flooding complete indicator at said active controller upon completion of said flooding.

10. The method of claim 1, further comprising:

switching over current operations to said standby controller in an instance said adjacency relationship between said active and standby controllers is terminated.

11. The method of claim 10, wherein termination of said adjacency relationship is caused by at least one of active controller failure and operator directive.

12. The method of claim 10, wherein said switching over operations comprises:

assuming, by said standby controller, an identification of said active controller; and sending, by said standby controller, hello messages to external peers.

13. The method of claim 10, further comprising flooding each LSA for which a flooding complete indicator was not received from the active controller;

flooding each LSA having reached a maximum age; and flooding of self-originated LSAs.

14. Apparatus for providing link state routing protocol redundancy in a router, comprising:

means for establishing an internal adjacency relationship between an active controller and a standby controller in said router comprising mirroring configuration data on the standby controller from the active controller; and means for synchronizing Hello information between said active and standby controllers, said synchronizing comprising said active controller suspending external Hello processing to peer routers and said standby controller sending acknowledgment messages to said active controller to signify updating of said standby controller; wherein external Hello processing at said active controller is reinitiated upon receiving said acknowledgement messages from said standby controller.

15. The apparatus of claim 14, wherein the means for establishing an internal adjacency relationship further comprises:

means for synchronizing database information between said active and standby controllers.

* * * * *

UNITED STATES PATENT AND TRADEMARK OFFICE
CERTIFICATE OF CORRECTION

PATENT NO. : 7,573,811 B2  
APPLICATION NO. : 11/091136  
DATED : August 11, 2009  
INVENTOR(S) : Pramod V. N. Koppol Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this

Seventh Day of September, 2010

David J. Kappos  
*Director of the United States Patent and Trademark Office*